United States Patent
Davydov et al.

(10) Patent No.: US 10,602,496 B2
(45) Date of Patent: Mar. 24, 2020

(54) CHANNEL QUALITY INDEX (CQI) REPORTING FOR SUPERPOSITION TRANSMISSIONS SCHEMES

(71) Applicant: Intel Corporation, Santa Clara, CA (US)

(72) Inventors: Alexei Davydov, Nizhny Novgorod (RU); Gi Wan Choi, San Jose, CA (US); Gregory Morozov, Nizhny Novgorod (RU)

(*) Notice: Subject to any disclaimer, the term of this patent is extended or adjusted under 35 U.S.C. 154(b) by 135 days.

(21) Appl. No.: 15/747,435

(22) PCT Filed: Dec. 24, 2015

(86) PCT No.: PCT/US2015/000351
§ 371 (c)(1),
(2) Date: Jan. 24, 2018

(87) PCT Pub. No.: WO2017/023230
PCT Pub. Date: Feb. 9, 2017

(65) Prior Publication Data
US 2018/0220399 A1    Aug. 2, 2018

Related U.S. Application Data

(60) Provisional application No. 62/199,884, filed on Jul. 31, 2015.

(51) Int. Cl.
*H04W 72/04* (2009.01)
*H04L 1/00* (2006.01)
(Continued)

(52) U.S. Cl.
CPC ........ *H04W 72/042* (2013.01); *H04B 7/0452* (2013.01); *H04B 7/0626* (2013.01); *H04B 7/0632* (2013.01); *H04L 1/0026* (2013.01)

(58) Field of Classification Search
CPC .. H04W 72/042; H04B 7/0452; H04L 5/0037; H04L 5/0048; H04L 27/3488
See application file for complete search history.

(56) References Cited

U.S. PATENT DOCUMENTS

2016/0337879 A1* 11/2016 Hwang ................ H04B 17/336
2016/0374060 A1* 12/2016 Lim ...................... H04L 5/0048
(Continued)

OTHER PUBLICATIONS

3GPP TSG RAN WG1 Meeting #81 (R1-153044); Downlink Multiuser Superposition Transmission Scheme Document for: Discussion and Decision; MediaTek Inc.; Agenda Item 6.2.7.3; Fukuoka, Japan; May 25-29, 2015.
(Continued)

*Primary Examiner* — Jung H Park

(57) ABSTRACT

Technology for an UE operable to report channel state information (CSI) for multi-user superposition transmissions (MUST) is disclosed. The UE can process a plurality of power offset parameters that are received from an eNodeB, for the MUST. The UE can perform a downlink channel measurement at a user equipment (UE). The UE can scale the downlink channel measurement using at least one of the plurality of power offset parameters to form one or more scaled downlink channel measurements. The UE can calculate CQI values for the one or more scaled downlink channel measurements. The UE can process, for transmission to the eNodeB, the CQI values for the one or more scaled downlink channel measurements to enable the UE to receive data on a physical downlink shared channel (PDSCH) using multi-user superposition transmission.

23 Claims, 12 Drawing Sheets

(51) Int. Cl.
*H04B 7/0452* (2017.01)
*H04B 7/06* (2006.01)

(56) References Cited

U.S. PATENT DOCUMENTS

2018/0027441 A1* 1/2018 Kim .................... H04B 7/0452
 370/311
2018/0160372 A1* 6/2018 Benjebbour .......... H04W 24/10

OTHER PUBLICATIONS

3GPP TSG RAN WG1 Meeting #82 (R1-154536); System-level evaluation results for downlink multiuser superposition schemes; NTT DOCOMO; Agenda Item 7.2.7.2; Beijing, China; Aug. 24-28, 2015.
3GPP TSG RAN WG1 Meeting #83 (R1-156534); CSI enhancement to support multi-user superposition transmission; Intel Corporation; Agenda Item 6.2.7.3; Anaheim, U.S.; Nov. 15-22, 2015.

* cited by examiner

| Differential CQI Value | Offset Value |
|---|---|
| 0 | 0 |
| 1 | 1 |
| 2 | 2 |
| 3 | ≥3 |

CHANNEL QUALITY INDEX (CQI) REPORTING FOR SUPERPOSITION TRANSMISSIONS SCHEMES

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node. Conventional LTE systems rely on orthogonal multiplexing of the resources for all physical channels.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 5 illustrates a table of mapping from a differential channel quality index (CQI) value to a CQI offset level in accordance with an example;

Figure 1:
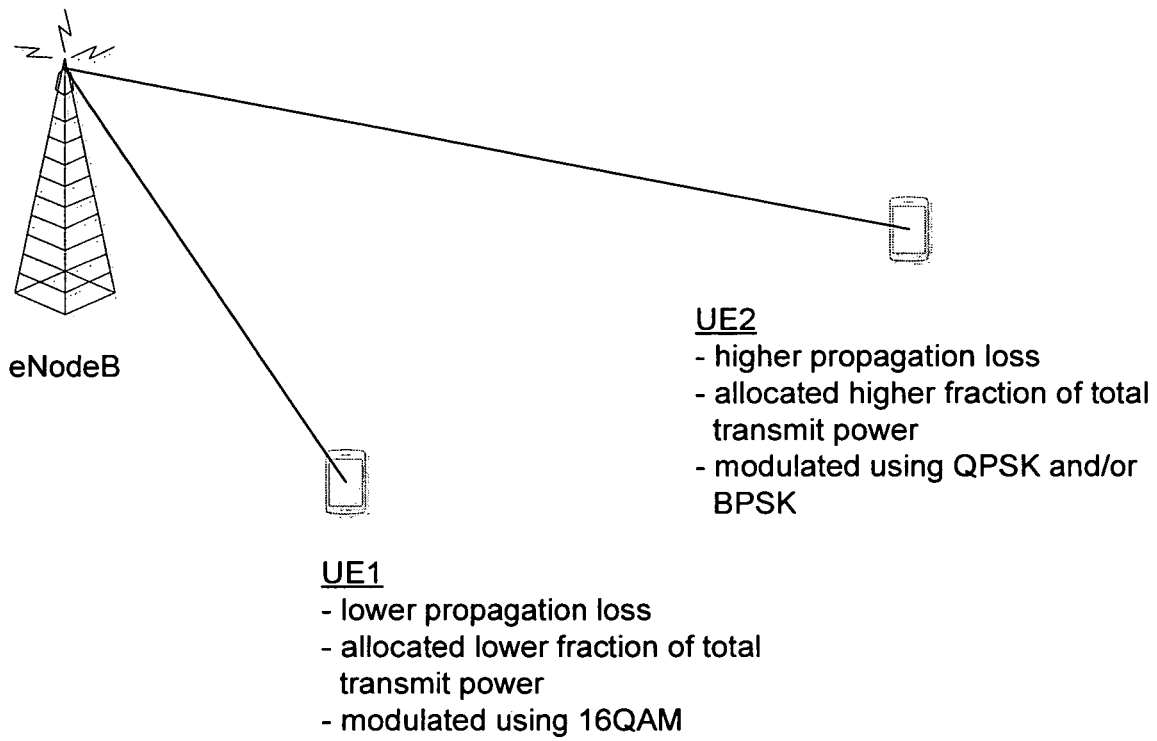
FIG. 1 illustrates a base station that is serving a first user equipment (UE) and a second UE in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Technology for a user equipment (UE) operable to report channel state information (CSI) for multi-user superposition transmissions (MUST) is disclosed. The UE can receive, from an UE, a plurality of power offset parameters for the MUST. The UE can perform a downlink channel measurements. The UE can scale the downlink channel measurement using at least one of the plurality of power offset parameters to form one or more scaled downlink channel measurements. The UE can calculate CQI values for the one or more scaled downlink channel measurements. The UE can transmit, to the eNodeB, the CQI values for the one or more scaled downlink channel measurements to enable the eNodeB to transmit data on a physical downlink shared channel (PDSCH) using multi-user superposition transmission.

Technology for a UE operable to report channel state information (CSI) for multi-user superposition transmissions (MUST) is disclosed. The eNodeB can transmit, to each of the plurality of user equipments (UEs), a plurality of power offset parameters for scaling one or more CQI reports. The eNodeB can process two or more CQI reports that are received from each of the plurality of UEs, wherein one or more of the two or more CQI reports are scaled based on one or more of the plurality of power offset parameters. The eNodeB can select two or more UEs from the plurality of UEs for the MUST. The eNodeB can transmit a physical downlink shared channel (PDSCH) to the two or more UEs using the MUST based on the one or more scaled CQI reports received from each of the two or more UEs.

Technology is disclosed for a User Equipment (UE) to perform channel state information (CSI) reporting for multi-user superposition transmissions (MUST), with an eNodeB. The UE can process a plurality of power offset parameters, which are received from an eNodeB, for the MUST. The UE can calculate CQI values for one or more scaled downlink channel measurements. The UE can process, for transmission to the eNodeB, the CQI values for the one or more scaled downlink channel measurements to enable the UE to receive data on a physical downlink shared channel (PDSCH) using multi-user superposition transmission.

In conventional 3GPP LTE Advanced (LTE-A) systems, as standardized in March 2011 as 3GPP Release 10, physical channels are transmitted by performing orthogonal multiplexing of the resources. For example, when an eNodeB performs scheduling on a group of UEs, the eNodeB can use distinct time and frequency resources for each of the UEs, such as distinct physical resource blocks (PRBs). In other words, the eNodeB can transmit signals to the UEs using different sub carriers or orthogonal frequency-division multiple access (OFDMA) symbols. As a result, different UEs can be assigned different time and frequency resources (i.e., different PRBs).

Figure 2A:
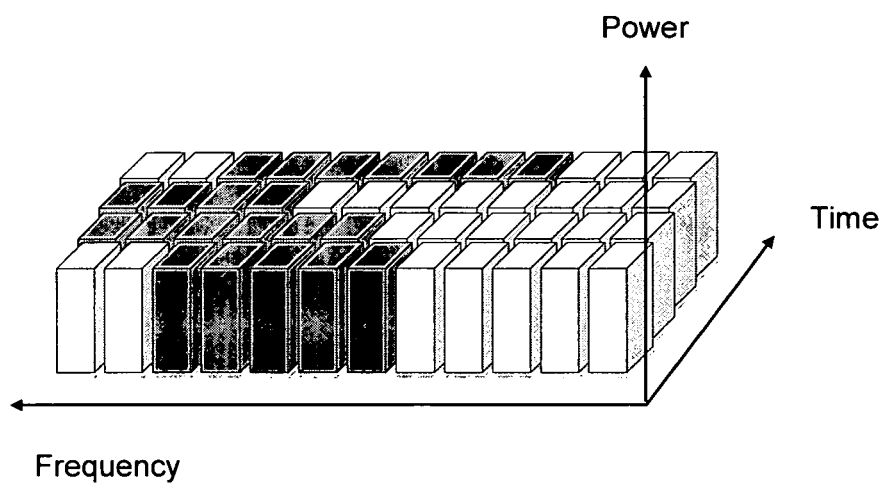
FIG. 2A illustrates time or frequency orthogonal multiplexing in accordance with an example.

FIG. 2A illustrates an example of time or frequency orthogonal multiplexing. The orthogonal multiplexing can be represented in terms of time, frequency and power. In orthogonal multiplexing, different time and frequency resources can be assigned to different user equipments (UEs). In other words, different physical resource blocks (PRBs) can be assigned to different UEs. In one example, the time and frequency resources are assigned in accordance with a total transmit power of an eNodeB.

In view of typical LTE-A deployments, the distribution of users in one cell may cause a relatively large difference in distances between the eNodeB and the served UEs, and the relatively large difference in distances can be exploited to further improve spectral efficiency of downlink transmissions. More specifically, the spectral efficiency can be improved by using a non-orthogonal multiplexing scheme, in which the eNodeB can perform scheduling on the group of UEs using the same time and frequency resources, but the eNodeB can split the power amongst the signals sent to the group of UEs. The non-orthogonal multiplexing scheme implemented at the eNodeB can result in multi-user superposition transmissions from the eNodeB.

FIG. 1 illustrates an exemplary configuration of a base station that is serving a first user equipment (UE) and a second UE. The first UE can be referred to as UE1 and the second UE can be referred to as UE2. The first UE can be located relatively close (e.g., a "near UE") to the base station, whereas the second UE can be located relatively far (e.g., a "far UE") from the base station. In addition, the first UE and the second UE can have different propagation losses due to their distances to the base station. For example, the first UE can have a low propagation loss due to being relatively close to the base station, and the second UE can have a high propagation loss due to being relatively far from the base station. In other words, the second UE can experience higher propagation losses as compared to the first UE.

In LTE-A convention systems, the base station can serve the first UE and the second UE using OFDMA by allocating non-overlapping time and frequency resources, such as non-overlapping time and frequency physical resource blocks (PRBs). In other words, the base station can send two signals to the first UE and the second UE that are non-overlapping in time and frequency.

In one embodiment, the base station can use non-orthogonal multiplexing to increase spectral efficiency., For example, the eNodeB can use the superposition of two signals that are sent to the first UE and the second UE. The eNodeB can multiplex signals to the first UE and the second UE on the same time and frequency resources. More specifically, the eNodeB can multiplex the two signals using the power domain. The eNodeB can be limited to a certain transmit power (P). The eNodeB can split the transmit power (P) between the first signal and the second signal, and then the eNodeB can transmit the first and second signals simultaneously to the first and second UEs, respectively, over the same time and frequency resources.

In one example, when the eNodeB is configured to perform multiuser superposition transmission, the first UE and the second UE can be served in the same time frequency resources, and a total transmit power of the eNodeB can be divided into P1 and P2 for the first and second signals designated to the first and second UEs, respectively. In this example of non-orthogonal multiplexing, first and second signals can be transmitted simultaneously over the same time and frequency resources. The signal power relative to noise for the first UE can be higher to that of the second UE, as the second UE has a larger propagation loss from the base station as compared to the first UE. The first signal received at the first UE can comprise a useful signal, signal interference due to the second signal transmitted to the second UE, and signal noise. Similarly, the second signal received at the second UE can comprise a useful signal, signal interference due to the first signal transmitted to the first UE, and signal noise. The first signal can cause intra-cell interference for the second UE, and the second signal can cause intra-cell interference for the first UE.

Figure 2B:
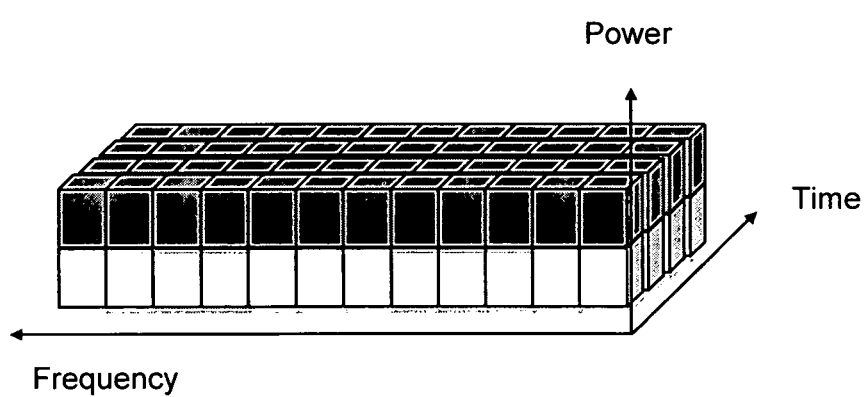
FIG. 2B illustrates time or frequency non-orthogonal multiplexing in accordance with an example.

FIG. 2B illustrates an example of time or frequency non-orthogonal multiplexing. The non-orthogonal multiplexing can be represented in terms of time, frequency and power. In non-orthogonal multiplexing, the same time and frequency resources can be assigned to different user equipments (UEs). In other words, the same physical resource blocks (PRBs) can be assigned to different UEs. In this example of non-orthogonal multiplexing, a total transmit power of an eNodeB can be split amongst the different signals sent to the different UEs. In non-orthogonal multiplexing, the total transmit power of the eNodeB is not increased, but rather, the amount of power distribution changes for the different UEs. In one example, non-orthogonal multiplexing in LTE can provide enhanced performance as compared to orthogonal multiplexing.

In one example, due to the first UE being closer to the base station as compared to the second UE (which results in lower propagation loss), a relative noise level can be lower for the first UE as compared to the second UE. In addition, since the first UE has a lower propagation loss as compared to the second UE, the signal to interference noise ratio (SINR) for the first UE is generally higher than the SINR for the second UE.

In one example, the first signal designated for the first UE can be allocated a relatively low fraction of the total transmit power, and the second signal designated for the second UE can be allocated a relatively high fraction of the total transmit power, based on the first UE being closer to the base station as compared to the second UE. In other words, the shorter distance between the base station and the first UE results in a lower power being allocated to the first signal, and the greater distance between the base station and the second UE results in a higher power being allocated to the second signal.

In one example, the eNodeB can use a higher order modulation scheme to modulate the first signal for the first UE, and the eNodeB can use a lower order modulation scheme to modulate the second signal for the second UE. Examples of modulation schemes, from lower to higher, include, but is not limited to, binary phase shift keying (BPSK), quadrature phase shift keying (QPSK), 8PSK, 16 quadrature amplitude modulation (16QAM), 64QAM, and 256QAM. Other types of modulation schemes may be used as well.

In one example, the higher order modulation scheme can be 16QAM (quadrature amplitude modulation) or and the lower order modulation scheme can be quadrature phase shift keying (QPSK). Therefore, the higher order modulation scheme, 16QAM, can be used to modulate the signal allocated with a lower fraction of the total transmit power (i.e., the first signal), and the lower order modulation scheme, QPSK can be used to modulate the signal allocated with a higher fraction of the total transmit power (i.e., the second signal). In this example, the higher order modulation scheme (i.e., 16QAM) is used for the closer UE with respect to the base station (i.e., the first UE) and the lower order modulation scheme (i.e., QPSK) and/or binary phase-shift keying (BPSK) can be used for the further UE with respect to the base station (i.e., the second UE). In one example, the base station can transmit (Tx) using the 16QAM (quadrature amplitude modulation) and/or BPSK.

In one example, at the first UE, the second signal modulated using QPSK is an interfering signal to the first signal modulated using 16QAM that is designated for the first UE. Since QPSK and/or binary phase-shift keying (BPSK) are low order modulation for the second signal, the second signal can be decoded by the first UE and cancelled prior to decoding the first signal. In other words, the first UE can receive both the first signal designated for the first UE and the second signal designated for the second UE. The first signal modulated using 16QAM is the useful signal to the first UE, and the second signal modulated using QPSK or BPSK is the interfering signal to the first UE. Since the first UE is located nearer to the base station, the first UE can decode the second signal (i.e., the interference signal modulated using QPSK and/or BPSK) and cancel the second signal prior to demodulation of the first signal (i.e., the useful signal modulated using 16QAM).

Similarly, at the second UE, the first signal modulated using 16QAM is the interfering signal to the second signal modulated using QPSK that is designated for the second UE. However, interference due to the first signal modulated using 16QAM is usually not significant. In some cases, at the second UE, interference from neighboring cells can be higher than the interference created by the first signal modulated using 16QAM. Therefore, the interference from the first signal modulated using 16QAM can be considered as additive noise, and the second UE generally does not perform any interference mitigation techniques when demodulating the second signal modulated using QPSK and/or BPSK.

As an example, by properly allocating a modulation and coding scheme (MCS) and power distribution (P1 and P2) among the first and second signals, both the first UE and the second UE can both receive and decode the signals. More specifically, since the relative noise level of the first UE is lower than the relative noise level of the second UE, the first UE can also receive the second signal for the second UE. The first UE can treat the second signal as interference. The first UE can subtract the second signal designated for the second UE (which is interference from the first UE's point of view) from the first signal, and the first UE can demodulate the remaining signal in the presence of noise. As long as the MCS for the first UE does not exceed a capacity of the channel without any interference, the first UE can receive the first and second signals.

While examples have been provided with the higher order modulation scheme as 16QAM and the lower order modulation scheme as QPSK, this is not intended to be limiting. The actual modulation schemes used at UE1 and UE2 can be selected based on system specifications, data rate specifications, bandwidth available, the signal plus interference to noise ratio (SINR) at each UE, the distance of each UE from the eNodeB, and other factors.

As described in further detail below, the first signal can be a first physical downlink shared channel (PDSCH) signal and the second signal can be a second PDSCH signal. The first and second signals can be transmitted to first and second UEs, respectively, as part of unicast transmission in 3GPP LTE.

Figure 3:
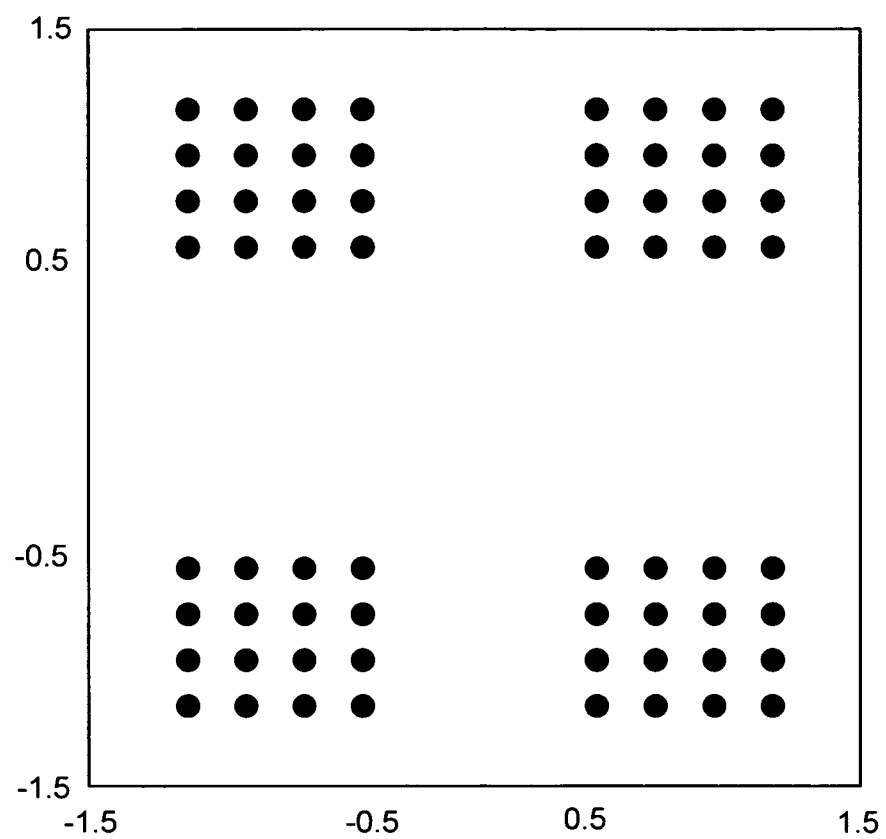
FIG. 3 illustrates an aggregated constellation of a multiplexed signal transmitted from a base station to multiple user equipments (UEs) in accordance with an example.

FIG. 3 illustrates an example of an aggregated constellation of a multiplexed signal transmitted from a base station to multiple user equipments (UEs). The multiplexed signal can include a first signal designated for a first UE and a second signal designated for a second UE. The first UE can be located closer to the base station as compared to the second UE. In one example, the first signal can be modulated using a higher order modulation scheme, such as 16QAM (quadrature amplitude modulation), and the second signal can be modulated using a lower order modulation scheme, such as quadrature phase shift keying (QPSK).

In one example, the aggregated constellation can comprise the multiplexing of the first signal modulated using 16QAM and the second signal modulated using QPSK. In other words, the aggregated constellation can represent a superposition of the first and second signals modulated using 16QAM and QPSK, respectively. As shown in FIG. 3, the first signal modulated using 16QAM is represented by 16 points, and the second signal modulated using QPSK is represented by 4 points. The aggregated (or composite) constellation can be derived by taking a linear combination of all possible points in a QPSK constellation and a 16QAM constellation.

In one example, the aggregated constellation can be defined based on the power split between the first and second signals. A total transmit power (P) associated with the eNodeB can be split among the two signals. The total power split can be defined by Pd1 and Pd2. For superposition transmission schemes, depending on the propagation condition (i.e., high propagation loss or low propagation loss), Pd1 and Pd2 are parameters that define the power split between the two signals. An optimal Pd1 and Pd2 can depend on a propagation difference between the first UE and the second UE. In the example shown in FIG. 3, the ratio of the Pd1 corresponding to first signal modulated using 16QAM and the Pd2 corresponding to the second signal modulated using QPSK is approximately 0.1. In other words the power allocated to the second signal is higher comparing to the power allocated to the first signal.

In one example, the receiver UE, such as the first UE or the second UE, can receive the aggregated constellation from the eNodeB, wherein the aggregated constellation comprises the first signal modulated using 16QAM and the second signal modulated QPSK. When the receiving UE is located closer to the base station, such as the first UE, the second signal modulated using QPSK can be considered as the interference signal for the first UE. However, since the second signal is a low order modulation signal (i.e., modulated using QPSK), the second signal can be cancelled prior to demodulation of the first signal modulated using 16QAM. On the other hand, when the receiving UE is located further away from the base station, such as the second UE, the first signal modulated using 16QAM would be the interference signal for the second UE. However, at the second UE, the interference due to the first signal modulated using 16QAM is generally insignificant. In some cases, the interference from the first signal modulated using 16QAM can be less than the interference at the second UE from neighboring cells. Therefore, the second UE generally does not perform any interference mitigation techniques when demodulating the second signal modulated using QPSK.

In one configuration, as specified in 3GPP TS 36.213 Section 7.2.3, a UE can be configured to provide a highest channel quality index (CQI) that results in a physical downlink shared channel (PDSCH) transport block transmission with a maximum block error rate (BLER) of 10%. Based on an unrestricted observation interval in time and frequency, the UE can derive for each CQI value reported in uplink subframe n the highest CQI index between 1 and 15 in Table 7.2.3-1 of 3GPP TS 36.213, which satisfies the following condition (or CQI index 0 if CQI index 1 does not satisfy the condition): a single PDSCH transport block with a combination of modulation scheme and transport block size corresponding to the CQI index, and occupying a group of downlink physical resource blocks termed the CSI reference resource, could be received with a transport block error probability not exceeding 0.1. The CQI report can be used to assist the eNB in a selection of the modulation and coding schemes (MCS) for the downlink transmission to the UE. However, the existing CQI definition may not be sufficient to support multi-user schemes.

In one aspect, a CQI report can be used to assist the eNB in a selection of the modulation and coding schemes (MCS) for the downlink transmission to the UE. More specifically, the reported CQI can be converted by the eNB to an MCS value that can be used for the downlink transmission. However, the existing CQI reporting assumes CQI reports are for single user transmission without multi-user superposition transmission. That is, existing CQI reporting does not consider 1) a power offset due to MUST transmission, and 2) possible interference created by a co-scheduled MUST layers (for UEs that can be located further than a UE that is located nearer to an eNodeB).

In one aspect, scheduling signal-to-interference-and-noise ratios (SINRs), which can be used to derive the MCS's for MUST transmission schemes can be approximated by using CQI derived at the UE assuming single-user transmission and the power offsets for two multiplexed MUST layers i.e. (Pd1, Pd2). This can be shown, where Pd1+Pd2=1, as follows: 1) scheduling a SINR of MUST for a first UE ($UE_1$) (e.g., a "near UE") with interference cancellation (IC) is Pd1×SINR($CQI_{UE1}$) and 2) scheduling a SINR of MUST for a second UE ($UE_2$) (e.g., a "far UE") without IC is SINR($CQI_{UE2}$)×Pd2/(SINR($CQI_{UE2}$)×Pd1+1). However, this approximation can be inefficient and suboptimal, due to quantization of the CQI values.

Figure 4:
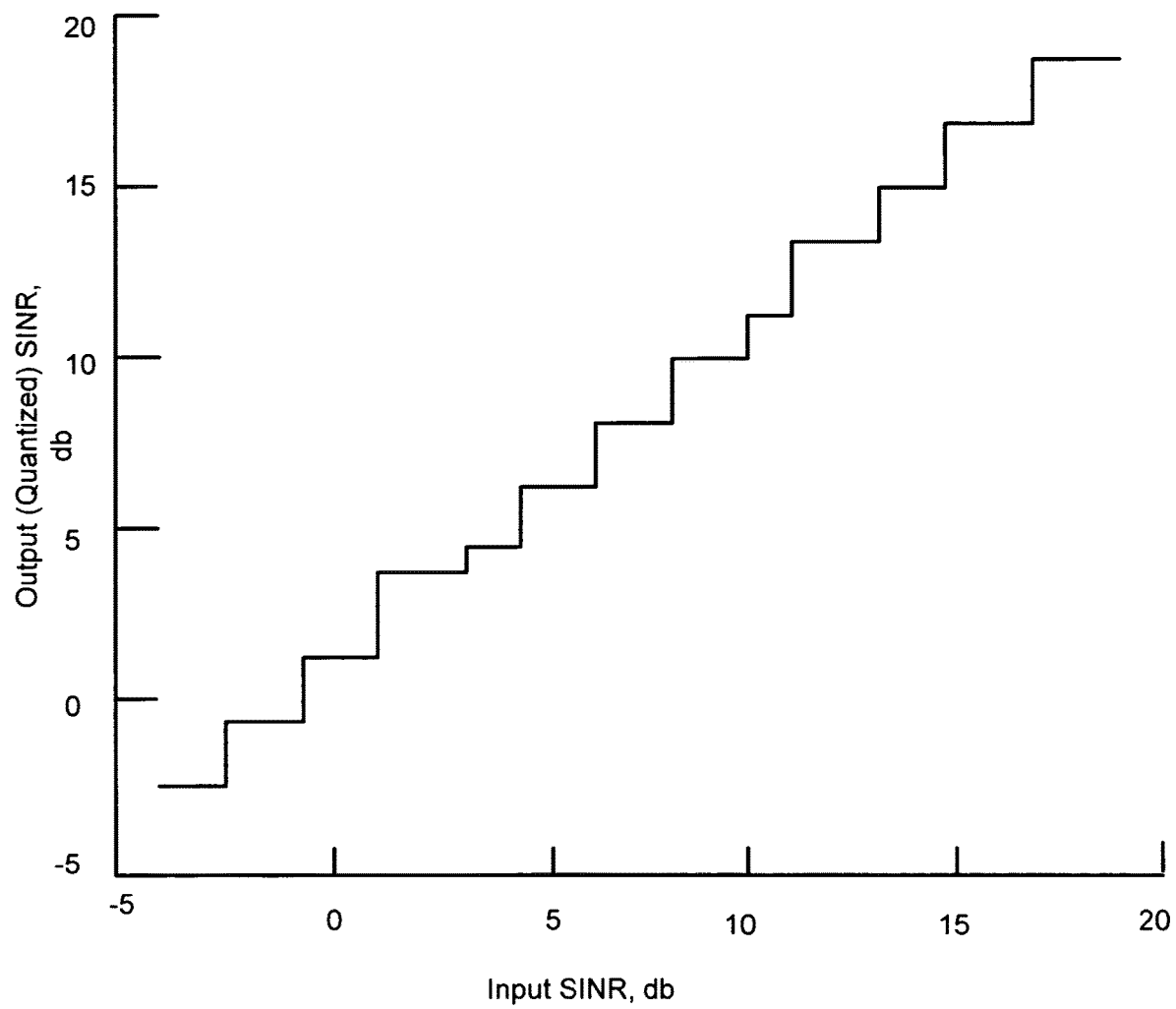
FIG. 4 illustrates a graph of a signal to interference plus noise ratio (SINR) quantization function in accordance with an example.

Turning now to FIG. 4, a graph is depicted of a SINR quantization function in accordance with an example. More specially, FIG. 4 depicts the example of the effective SINR quantization function due to CQI. It can be seen that a near UE (e.g., the first UE) with an effective SINR above 20 dB (i.e. having significant SINR margin) reports a highest CQI index corresponding to the effective SINR of ~20 dB, such as by performing SINR clipping. In this case, an eNB would not have the information about an extra SINR budget available at the UE and assume conservative SINR($CQI_{UE1}$) is approximately 20 dB. After approximation for scheduling SINR for UE1, the selected MCS would be reduced due to scaling of 20 dB SINR by Pd1. For example, in case of Pd=0.1, the SINR which is used to derive the MUST MCS would be reduced to 10 dB, so that the more robust MCS would be selected by the eNB for the PDSCH in spite of the possibly higher actual SINR at the UE.

Thus, the present technology proposes an alternative approach of the CQI calculation to support multi-user superposition transmission schemes. That is, the present technology provides a new approach for CQI calculation for the MUST schemes. More specifically, the present technology proposes signaling of the power offset values ("Pd") that can be used by the UE to derive more than one CQI report. That is, the signaling of the power offset values Pd can be used by the UE to derive more than one CQI report for a given measurement resource (e.g. subband and/or layer). The set of Pd values that can be signalled to the UE can be defined in the range of 0 to 1 (in linear domain) and quantized. The set of Pd values indicated to the UE can describe one of a plurality of possible power reductions due to superposition transmission, where one of the power offset values (PD) equals 1 (e.g., Pd=1) and corresponds to a conventional single-user transmission without MUST. That is, the set of Pd values can describe a subset of one or more possible power offsets that can be used by the eNB for multi-user superposition transmission, where, as stated above, one of the power offsets (represented as Pd is equal to 1, e.g., "Pd=1") corresponds to a reference single-user transmission without MUST. In one aspect, the channel measurements from the serving cell/point can be scaled by a value of Pd prior to calculation of the corresponding CQI values. That is, the channel measurements on the channel state information (CSI) reference signals (CSI-RS) or cell specific reference signals (CRS) from the serving cell/point can be scaled at the UE by the value of square rooting one or more of the power offsets, Pd, (e.g., $\sqrt{Pd}$) prior to calculating corresponding CQI values.

In one aspect, if the Pd configured for the UE is above 0.5 (in linear domain) of the 0 to 1 predefined range of power offsets (Pd), i.e. the UE is the second UE, the UE receiver can consider a remaining power (e.g., remaining power being equal to 1 minus Pd (e.g., remaining power=1−Pd) as interference in the calculation of the CQI reports, where for interference power calculation, a UE can assume the precoding in accordance Pre-coding matrix indicator (PMI) reported by the UE for corresponding measurement resource. For example, the additional interference that UE should consider for CQI calculation can be derived as $(1-Pd)HV(HV)^H$, where H is the channel matrix measured using the reference signals transmitted by the eNodeB and V is the selected PMI. Calculated CQI reports for different Pd values can be reported by the UE to eNB. That is, multiple CQI reports can be calculated for each of the different Pd values and can be reported by the UE to eNB. The Pd values can be restricted to be used only for a CQI calculation and can be restricted from being used in the calculation of a rank indicator (RI) and PMI reports. In one aspect, the UE can calculate the BLER performance of a different MCS using special look up tables of BLER compared to (vs.) SINR and picks the best one that satisfies the target BLER of 10%.

In one aspect, in order to save signaling overhead in the uplink due to additional CQIs, differential CQI reporting may be considered. More specifically, differential CQI offset level may be calculated as a CQI index corresponding to a reference Pd minus a CQI index (e.g., reference Pd–CQI index) corresponding to a configured Pd and reported by the UE, where one of the power offset Pd can be the reference power offset and can be equal to one (e.g., "Pd=1"). This can be depicted in the example of FIG. 5, where FIG. 5 illustrates a table of mapping from a differential channel quality index (CQI) value to a CQI offset level in accordance with an example. The mapping from a 2-bit differential CQI value to the CQI offset level is depicted. A differential CQI value of 0 can correspond to the same CQI as CQI calculate for the reference Pd (i.e. Pd=1). A differential CQI value of 1 can correspond to CQI with the index which is less by 1 comparing to the index of the reference CQI. A differential CQI value of 2 can correspond to CQI with the index which is less by 2 comparing to the CQI index of the reference CQI. A differential CQI value of 3 can correspond CQI with the index which is less by 3 or more comparing to the index of the reference CQI. Each CQI report with values from 0 to 15, can be transmitted using four bits. The use of a differential CQI, as shown in FIG. 5, can reduce the number of bits used to transmit the CQI from four bits to two bits.

Figure 6:
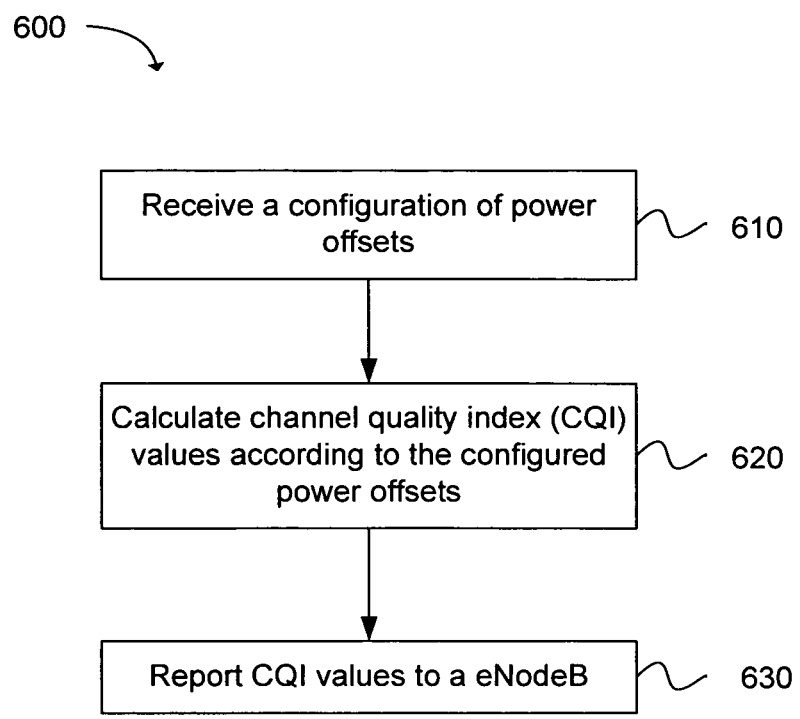
FIG. 6 depicts functionality of a UE operable to perform channel quality index (CQI) calculation and reporting for multi-user superposition transmissions in accordance with an example.

FIG. 6 depicts functionality 600 of a UE operable to perform a channel quality index (CQI) calculation and reporting for multi-user superposition transmissions with an eNodeB in accordance with an example. The functionality can be implemented as a method or the functionality can be executed as instructions on a machine, where the instructions are included on one or more computer readable medium or one or more non-transitory machine readable storage medium. The UE can comprise one or more processors configured to: receive, from the eNodeB, a configuration of power offsets, as in block 610. The UE can comprise one or more processors configured to: calculate channel quality index (CQI) values according to the configured power offsets, as in block 620. The UE can comprise one or more processors configured to: report CQI values to the eNodeB, as in block 630.

It should be noted that each of the following can be included in FIG. 6. In other words, each of the following may be included in each of the actions and/or in conjunction with one or more of the actions described in FIG. 6. For example, for channel state information (CSI) reporting from the user equipment (UE), a higher layer configuration of the UE for reception of the physical downlink shared channel (PDSCH) using multi-user superposition transmission can be applied for a CSI measurement resource reporting two or more channel quality reports (CQIs) to the evolved Node B (eNB). In one aspect, the high layer configuration can comprise radio resource control (RRC) signaling for two or more power offset values Pd that can be used by the UE for CQI calculation. Each configured power offset Pd can be used by the UE to scale a post processing SINR estimated at the UE prior to conversion to the CQI. Each configured power offset can be used by the UE to scale the channel measurements estimated at the UE for CQI calculation. A reaming power (e.g., remaining power being defined as 1–Pd) can be assumed by the UE as interference for CQI calculation. Also, two or more CQIs can be differentially encoded relative to a reference CQI for the reporting. The reference CQI can correspond to a "no power offset", which can be defined as being equal to 1 (e.g., Pd=1).

Figure 7:
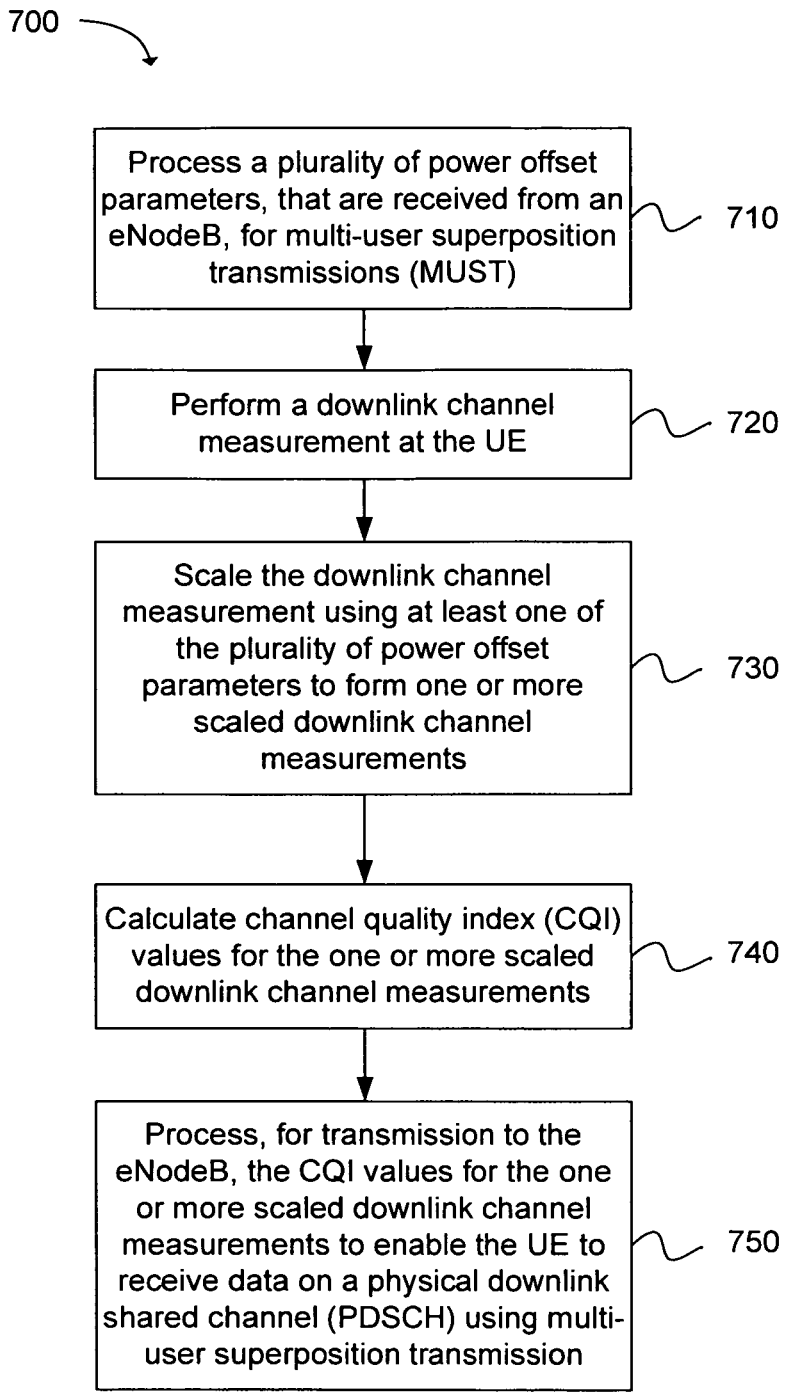
FIG. 7 depicts functionality of an eNodeB operable to perform report channel state information (CSI) for multi-user superposition transmissions (MUST) in accordance with an example.

FIG. 7 depicts functionality of a user equipment (UE) operable to perform channel quality index (CQI) calculation and reporting for multi-user superposition transmissions. The example of FIG. 7 provides functionality 700 of an eNodeB operable to report channel state information (CSI) for multi-user superposition transmissions (MUST), as shown in the flow chart in FIG. 7. The functionality can be implemented as a method or the functionality can be executed as instructions on a machine, where the instructions are included on one or more computer readable medium or one or more non-transitory machine readable storage medium. The UE can comprise one or more processors configured to: process a plurality of power offset parameters, that are received from an eNodeB, for multi-user superposition transmissions (MUST), as in block 710. The UE can comprise one or more processors configured to: perform a downlink channel measurement at the UE, as in block 720. The UE can comprise one or more processors configured to: scale the downlink channel measurement using at least one of the plurality of power offset parameters to form one or more scaled downlink channel measurements, as in block 730. The UE can comprise one or more processors configured to: calculate CQI values for the one or more scaled downlink channel measurements, as in block 740. The UE can comprise one or more processors configured to: process, for transmission to the eNodeB, the CQI values for the one or more scaled downlink channel measurements to enable the UE to receive data on a physical downlink shared channel (PDSCH) using multi-user superposition transmission, as in block 750.

Figure 8:
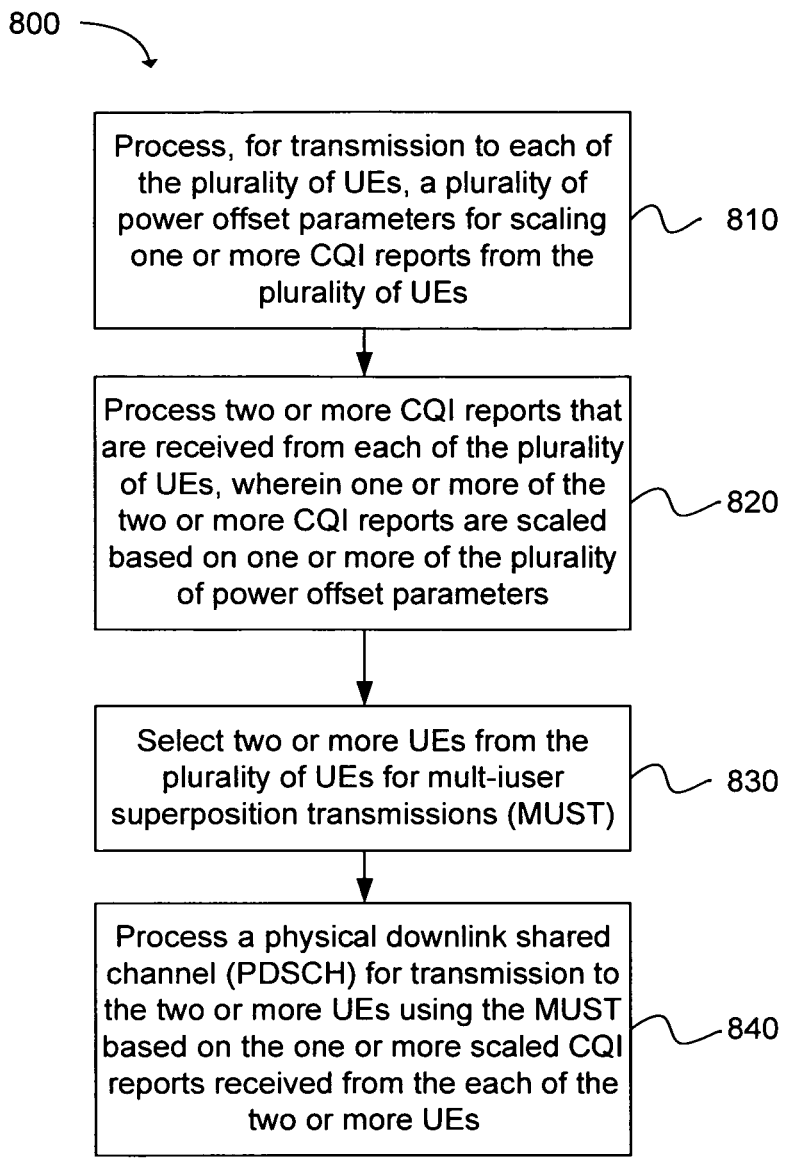
FIG. 8 depicts additional functionality of an eNodeB operable to perform channel state information (CSI) reporting for multi-user superposition transmissions (MUST) in accordance with an example.

FIG. 8 depicts additional functionality of an UE operable to perform channel state information (CSI) reporting for multi-user superposition transmissions (MUST). The example of FIG. 8 provides functionality 800 of an eNodeB operable to report channel state information (CSI) for multi-user superposition transmissions (MUST), as shown in the flow chart in FIG. 8. The functionality can be implemented as a method or the functionality can be executed as instructions on a machine, where the instructions are included on one or more computer readable medium or one or more non-transitory machine readable storage medium. The eNodeB can comprise one or more processors configured to: process, for transmission to each of the plurality of UEs, a plurality of power offset parameters for scaling one or more CQI reports from the plurality of UEs, as in block 810. The eNodeB can comprise one or more processors configured to: process two or more CQI reports that are received from each of the plurality of UEs, wherein one or more of the two or more CQI reports are scaled based on one or more of the plurality of power offset parameters, as in block 820. The eNodeB can comprise one or more processors configured to: select two or more UEs from the plurality of UEs for the MUST, as in block 830. The eNodeB can comprise one or more processors configured to: process a physical downlink shared channel (PDSCH) for transmission to the two or more UEs using the MUST based on the one or more scaled CQI reports received from the each of the two or more UEs, as in block 840.

Figure 9:
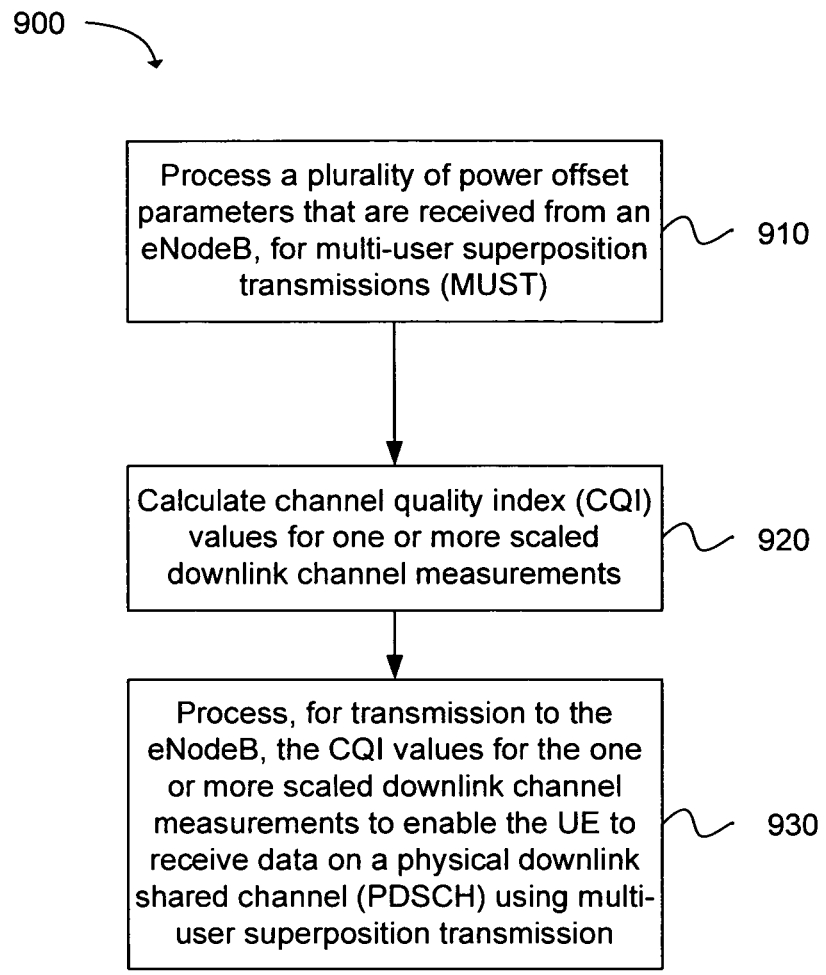
FIG. 9 depicts a flowchart of a non-transitory machine readable storage medium having instructions embodied thereon for performing channel state information (CSI) reporting for multi-user superposition transmissions (MUST) in accordance with an example.

Another example provides one or more transitory or non-transitory machine readable storage mediums having instructions 900 embodied thereon for performing channel state information (CSI) reporting for multi-user superposition transmissions (MUST), as shown in the flow chart in FIG. 9. The method can be executed as instructions on a machine, where the instructions are included on at least one computer readable medium or one non-transitory machine readable storage medium. The instructions when executed perform: process a plurality of power offset parameters that are received from an eNodeB, for multi-user superposition transmissions (MUST), as in block 910. The instructions when executed perform: calculate CQI values for one or more scaled downlink channel measurements, as in block 920. The instructions when executed perform: process, for transmission to the eNodeB, the CQI values for the one or more scaled downlink channel measurements to enable the UE to receive data on a physical downlink shared channel (PDSCH) using multi-user superposition transmission, as in block 930.

Figure 10:
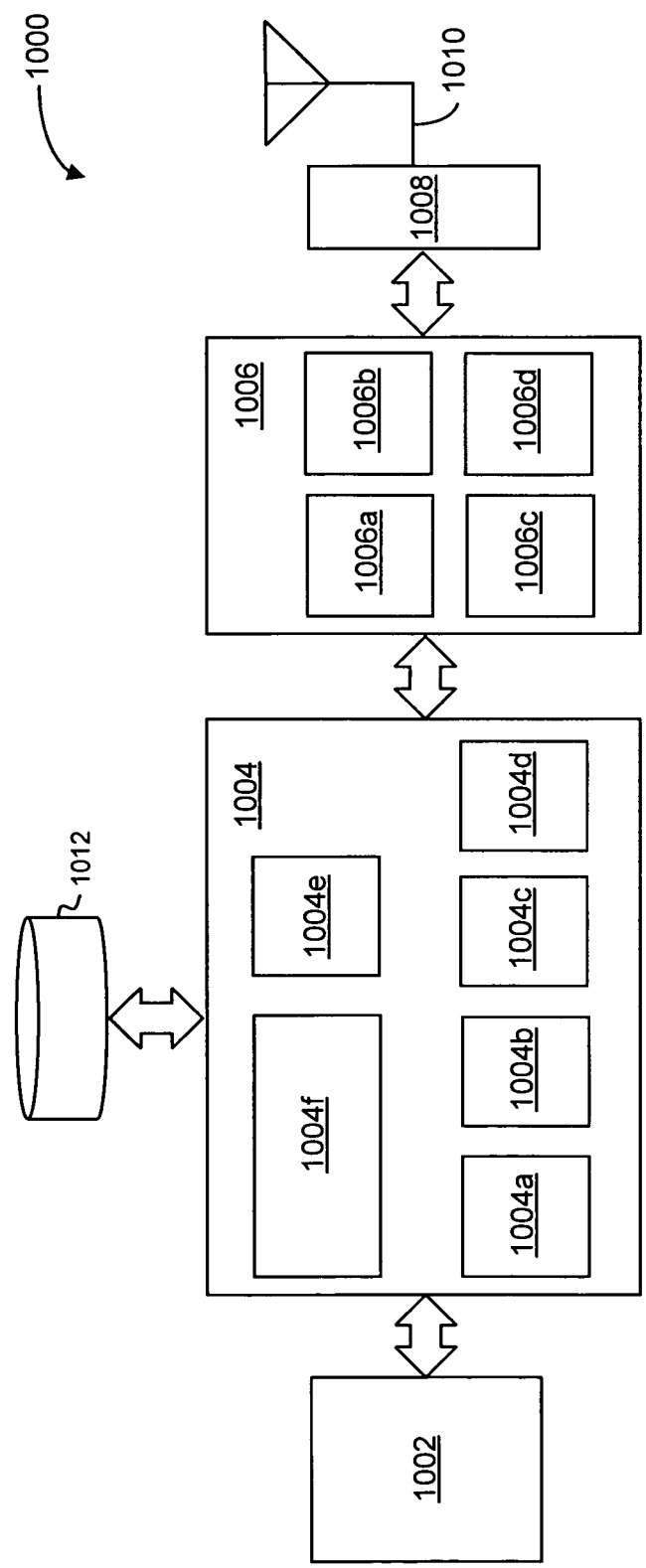
FIG. 10 illustrates a diagram of a wireless device (e.g., UE) in accordance with an example.

FIG. 10 provides an example illustration of a user equipment (UE) device 1000, such as a wireless device, a mobile station (MS), a mobile wireless device, a mobile communication device, a tablet, a handset, or other type of wireless device. The UE device 1000 can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The UE device 1000 can be configured to communicate using at least one wireless communication standard including 3GPP LTE, WiMAX, High Speed Packet Access (HSPA), Bluetooth, and WiFi. The UE device 1000 can communicate using separate antennas for each wireless communication standard or shared antennas for multiple wireless communication standards. The UE device 1000 can communicate in a wireless local area network (WLAN), a wireless personal area network (WPAN), and/or a WWAN.

In some embodiments, the UE device 1000 may include application circuitry 1002, baseband circuitry 1004, Radio Frequency (RF) circuitry 1006, front-end module (FEM) circuitry 1008 and one or more antennas 1010, coupled together at least as shown.

The application circuitry 1002 may include one or more application processors. For example, the application circuitry 1002 may include circuitry such as, but not limited to, one or more single-core or multi-core processors. The processor(s) may include any combination of general-purpose processors and dedicated processors (e.g., graphics processors, application processors, etc.). The processors may be coupled with and/or may include a storage medium 1012, and may be configured to execute instructions stored in the storage medium 1012 to enable various applications and/or operating systems to run on the system.

The baseband circuitry 1004 may include circuitry such as, but not limited to, one or more single-core or multi-core processors. The baseband circuitry 1004 may include one or more baseband processors and/or control logic to process baseband signals received from a receive signal path of the RF circuitry 1006 and to generate baseband signals for a transmit signal path of the RF circuitry 1006. Baseband processing circuity 1004 may interface with the application circuitry 1002 for generation and processing of the baseband signals and for controlling operations of the RF circuitry 1006. For example, in some embodiments, the baseband circuitry 1004 may include a second generation (2G) baseband processor 1004a, third generation (3G) baseband processor 1004b, fourth generation (4G) baseband processor 1004c, and/or other baseband processor(s) 1004d for other existing generations, generations in development or to be developed in the future (e.g., fifth generation (5G), 6G, etc.). The baseband circuitry 1004 (e.g., one or more of baseband processors 1004a-d) may handle various radio control functions that enable communication with one or more radio networks via the RF circuitry 1006. The radio control functions may include, but are not limited to, signal modulation/demodulation, encoding/decoding, radio frequency shifting, etc. In some embodiments, modulation/demodulation circuitry of the baseband circuitry 1004 may include Fast-Fourier Transform (FFT), precoding, and/or constellation mapping/demapping functionality. In some embodiments, encoding/decoding circuitry of the baseband circuitry 1004 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1004 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1004e of the baseband circuitry 1004 may be configured to run elements of the protocol stack for signaling of the PHY, MAC, RLC, PDCP and/or RRC layers. In some embodiments, the baseband circuitry may include one or more audio digital signal processor(s) (DSP) 104f. The audio DSP(s) 104f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1004 and the application circuitry 1002 may be implemented together such as, for example, on a system on a chip (SOC).

In some embodiments, the baseband circuitry 1004 may provide for communication compatible with one or more radio technologies. For example, in some embodiments, the baseband circuitry 1004 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 1004 is configured to support radio communications of more than one wireless protocol may be referred to as multi-mode baseband circuitry.

The RF circuitry 1006 may enable communication with wireless networks using modulated electromagnetic radiation through a non-solid medium. In various embodiments, the RF circuitry 1006 may include switches, filters, amplifiers, etc. to facilitate the communication with the wireless network. RF circuitry 1006 may include a receive signal path which may include circuitry to down-convert RF signals received from the FEM circuitry 1008 and provide baseband signals to the baseband circuitry 1004. RF circuitry 1006 may also include a transmit signal path which may include circuitry to up-convert baseband signals provided by the baseband circuitry 1004 and provide RF output signals to the FEM circuitry 1008 for transmission.

In some embodiments, the RF circuitry 1006 may include a receive signal path and a transmit signal path. The receive signal path of the RF circuitry 1006 may include mixer circuitry 1006a, amplifier circuitry 1006b and filter circuitry 1006c. The transmit signal path of the RF circuitry 1006 may include filter circuitry 1006c and mixer circuitry 1006a. RF circuitry 1006 may also include synthesizer circuitry 1006d for synthesizing a frequency for use by the mixer circuitry 1006*a* of the receive signal path and the transmit signal path. In some embodiments, the mixer circuitry 1006*a* of the receive signal path may be configured to down-convert RF signals received from the FEM circuitry 1008 based on the synthesized frequency provided by synthesizer circuitry 1006*d*. The amplifier circuitry 1006*b* may be configured to amplify the down-converted signals and the filter circuitry 1006*c* may be a low-pass filter (LPF) or band-pass filter (BPF) configured to remove unwanted signals from the down-converted signals to generate output baseband signals. Output baseband signals may be provided to the baseband circuitry 1004 for further processing. In some embodiments, the output baseband signals may be zero-frequency baseband signals, although this may be optional. In some embodiments, mixer circuitry 1006*a* of the receive signal path may comprise passive mixers, although the scope of the embodiments is not limited in this respect.

In some embodiments, the mixer circuitry 1006*a* of the transmit signal path may be configured to up-convert input baseband signals based on the synthesized frequency provided by the synthesizer circuitry 1006*d* to generate RF output signals for the FEM circuitry 1008. The baseband signals may be provided by the baseband circuitry 1004 and may be filtered by filter circuitry 1006*c*. The filter circuitry 1006*c* may include a low-pass filter (LPF), although the scope of the embodiments is not limited in this respect.

In some embodiments, the mixer circuitry 1006*a* of the receive signal path and the mixer circuitry 1006*a* of the transmit signal path may include two or more mixers and may be arranged for quadrature down-conversion and/or up-conversion respectively. In some embodiments, the mixer circuitry 1006*a* of the receive signal path and the mixer circuitry 1006*a* of the transmit signal path may include two or more mixers and may be arranged for image rejection (e.g., Hartley image rejection). In some embodiments, the mixer circuitry 1006*a* of the receive signal path and the mixer circuitry 1006*a* may be arranged for direct down-conversion and/or direct up-conversion, respectively. In some embodiments, the mixer circuitry 1006*a* of the receive signal path and the mixer circuitry 1006*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1006 may include analog-to-digital converter (ADC) and digital-to-analog converter (DAC) circuitry and the baseband circuitry 1004 may include a digital baseband interface to communicate with the RF circuitry 1006.

In some dual-mode embodiments, a separate radio IC circuitry may be provided for processing signals for each spectrum, although the scope of the embodiments is not limited in this respect.

In some embodiments, the synthesizer circuitry 1006*d* may be a fractional-N synthesizer or a fractional N/N+1 synthesizer, although the scope of the embodiments is not limited in this respect as other types of frequency synthesizers may be suitable. For example, synthesizer circuitry 1006*d* may be a delta-sigma synthesizer, a frequency multiplier, or a synthesizer comprising a phase-locked loop with a frequency divider.

The synthesizer circuitry 1006*d* may be configured to synthesize an output frequency for use by the mixer circuitry 1006*a* of the RF circuitry 1006 based on a frequency input and a divider control input. In some embodiments, the synthesizer circuitry 1006*d* may be a fractional N/N+1 synthesizer.

In some embodiments, frequency input may be provided by a voltage controlled oscillator (VCO), although this may be optional. Divider control input may be provided by either the baseband circuitry 1004 or the applications processor 1002 depending on the desired output frequency. In some embodiments, a divider control input (e.g., N) may be determined from a look-up table based on a channel indicated by the applications processor 1002.

Synthesizer circuitry 1006*d* of the RF circuitry 1006 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1006*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1006 may include an IQ/polar converter.

FEM circuitry 1008 may include a receive signal path which may include circuitry configured to operate on RF signals received from one or more antennas 1010, amplify the received signals and provide the amplified versions of the received signals to the RF circuitry 1006 for further processing. FEM circuitry 1008 may also include a transmit signal path which may include circuitry configured to amplify signals for transmission provided by the RF circuitry 1006 for transmission by one or more of the one or more antennas 1010.

In some embodiments, the FEM circuitry 1008 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1006). The transmit signal path of the FEM circuitry 1008 may include a power amplifier (PA) to amplify input RF signals (e.g., provided by RF circuitry 1006), and one or more filters to generate RF signals for subsequent transmission (e.g., by one or more of the one or more antennas 1010.

In some embodiments, the UE device 1000 may include additional elements such as, for example, memory/storage, display (e.g., touch screen), camera, antennas, keyboard, microphone, speakers, sensor, and/or input/output (I/O) interface.

Figure 11:
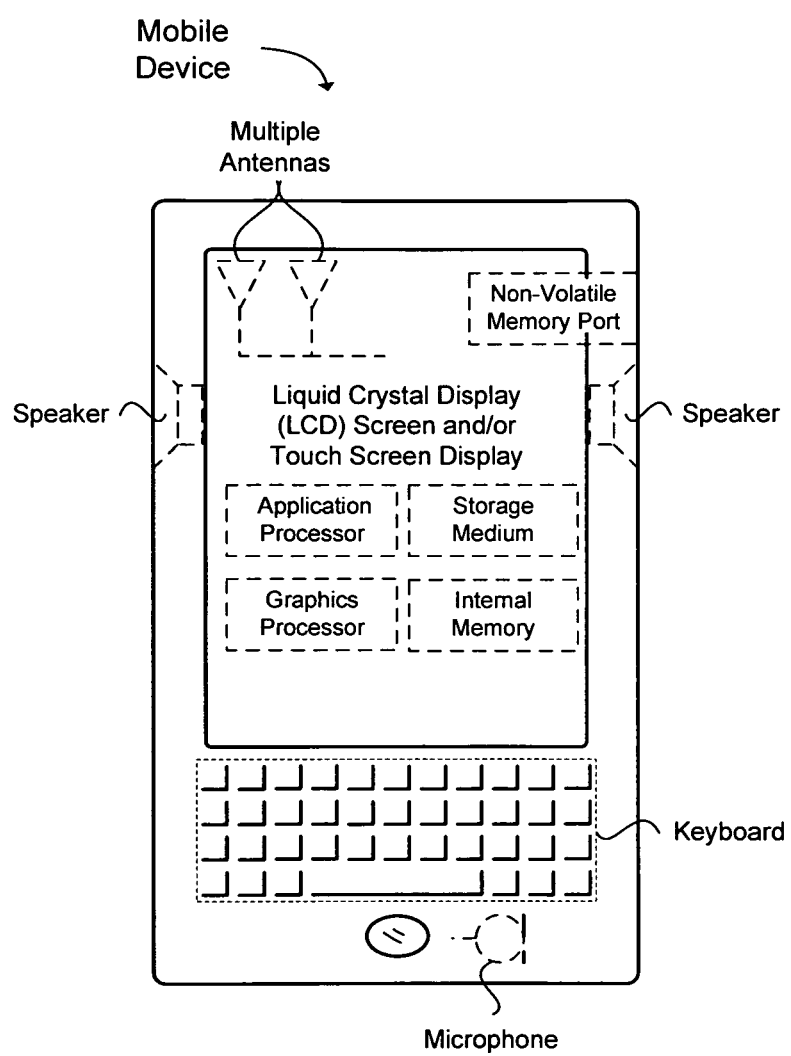
FIG. 11 illustrates a diagram of a wireless device (e.g., UE) in accordance with an example.

FIG. 11 illustrates a diagram 1100 of a wireless device (e.g., UE) in accordance with an example. FIG. 11 provides an example illustration of the wireless device, such as a user equipment (UE), a mobile station (MS), a mobile wireless device, a mobile communication device, a tablet, a handset, or other type of wireless device. In one aspect, the wireless device can include at least one of an antenna, a touch sensitive display screen, a speaker, a microphone, a graphics processor, a baseband processor, an application processor, internal memory, a non-volatile memory port, and combinations thereof.

The wireless device can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

Figure 12:
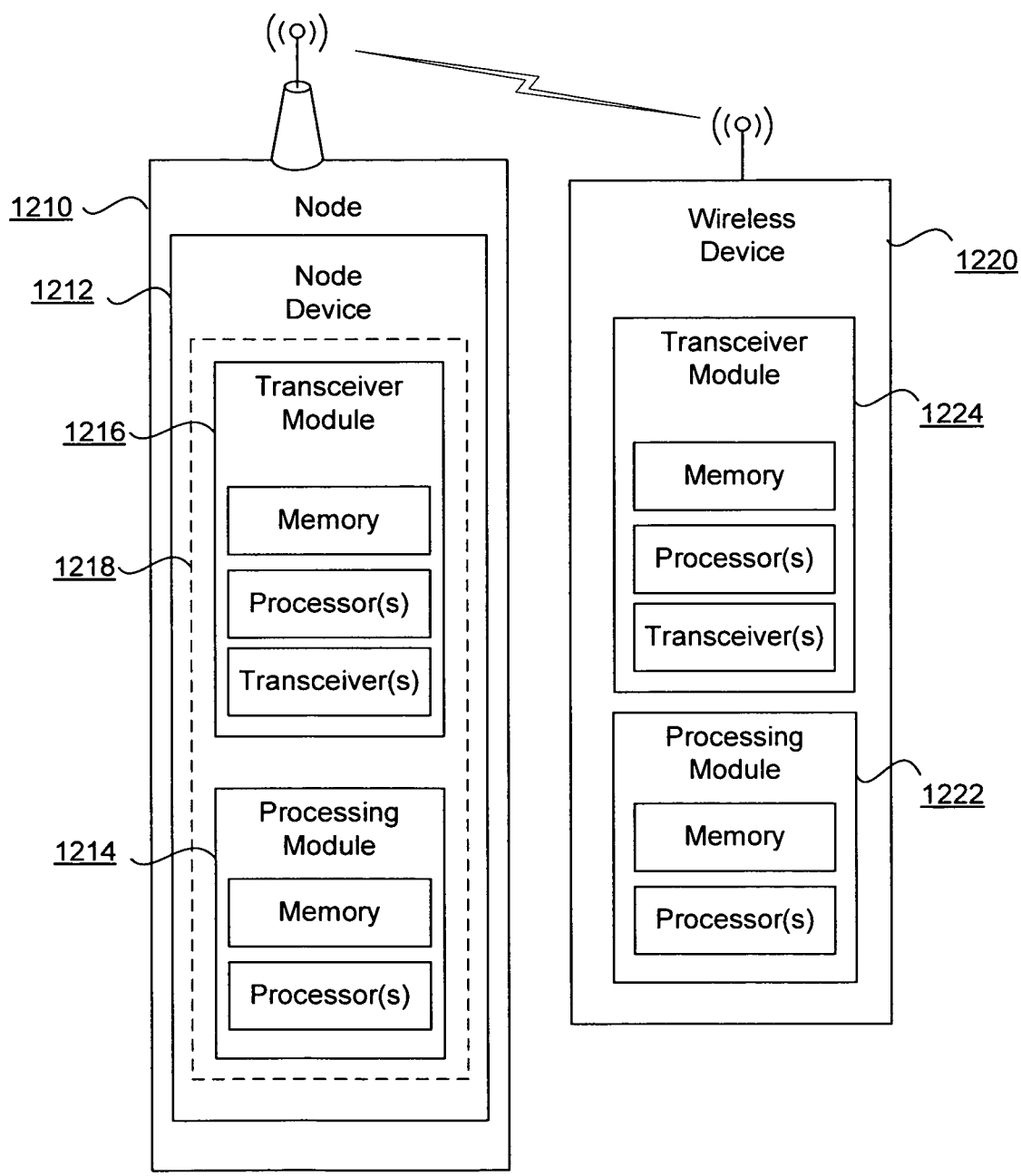
FIG. 12 illustrates a diagram of example components of a User Equipment (UE) device in accordance with an example.

As used herein, the term "circuitry" can refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some aspects, the circuitry can be implemented in, or functions associated with the circuitry can be implemented by, one or more software or firmware modules. In some aspects, circuitry can include logic, at least partially operable in hardware FIG. 12 illustrates a diagram 1200 of a node 1210 (e.g., eNB and/or a Serving GPRS Support Node) and wireless device (e.g., UE) in accordance with an example. The node can include a base station (BS), a Node B (NB), an evolved Node B (eNB), a baseband unit (BBU), a remote radio head (RRH), a remote radio equipment (RRE), a remote radio unit (RRU), or a central processing module (CPM). In one aspect, the node can be a Serving GPRS Support Node. The node 1210 can include a node device 1212. The node device 1212 or the node 1210 can be configured to communicate with the wireless device 1220. The node device 1212 can be configured to implement the technology described. The node device 1212 can include a processing module 1214 and a transceiver module 1216. In one aspect, the node device 1212 can include the transceiver module 1216 and the processing module 1214 forming a circuitry 1218 for the node 1210. In one aspect, the transceiver module 1216 and the processing module 1214 can form a circuitry of the node device 1212. The processing module 1214 can include one or more processors and memory. In one embodiment, the processing module 1222 can include one or more application processors. The transceiver module 1216 can include a transceiver and one or more processors and memory. In one embodiment, the transceiver module 1216 can include a baseband processor.

The wireless device 1220 can include a transceiver module 1224 and a processing module 1222. The processing module 1222 can include one or more processors and memory. In one embodiment, the processing module 1222 can include one or more application processors. The transceiver module 1224 can include a transceiver and one or more processors and memory. In one embodiment, the transceiver module 1224 can include a baseband processor. The wireless device 1220 can be configured to implement the technology described. The node 1210 and the wireless devices 1220 can also include one or more storage mediums, such as the transceiver module 1216, 1224 and/or the processing module 1214, 1222.

EXAMPLES

The following examples pertain to specific technology embodiments and point out specific features, elements, or steps that can be used or otherwise combined in achieving such embodiments.

Example 1 includes an apparatus of a user equipment (UE) operable to report channel state information (CSI) for multi-user superposition transmissions (MUST), the apparatus comprising one or more processors and memory configured to; process a plurality of power offset parameters, that are received from an eNodeB, for the MUST; perform a downlink channel measurement at the UE; scale the downlink channel measurement using at least one of the plurality of power offset parameters to form one or more scaled downlink channel measurements; calculate CQI values for the one or more scaled downlink channel measurements; and process, for transmission to the eNodeB, the CQI values for the one or more scaled downlink channel measurements to enable the UE to receive data on a physical downlink shared channel (PDSCH) using multi-user superposition transmission.

Example 2 includes the apparatus of example 1, wherein each of the plurality of power offset parameters are defined within a predetermined range.

Example 3 includes the apparatus of example 1, further configured to process, the plurality of power offset parameters, received from the eNodeB, on at least one of a radio resource control (RRC), a system information block (SIB), or a master information block (MIB).

Example 4 includes the apparatus of example 1, further configured to scale the downlink channel measurement on the CSI-RS by square rooting the plurality of power offset parameters prior to calculating the CQI values.

Example 5 includes the apparatus of example 1, further configured to determine a remaining power as interference if one or more of the plurality of power offset parameters is equal to or greater than a predefined threshold.

Example 6 includes the apparatus of example 1, further configured to restrict the use of each of the plurality of power offset parameters to be used only for calculating the CQI values.

Example 7 includes the apparatus of example 1, further configured to calculate a differential CQI offset level corresponding to one or more of the plurality of power offset parameters.

Example 8 includes the apparatus of example 1, further configured to process, for transmission to the eNodeB, the one or more scaled channel measurements, wherein each of the one or more scaled channel measurements are configured as a differential CQI value relative to an unscaled reference CQI value.

Example 9 includes the apparatus of example 1, further configured to differentially encode the CQI values relative to a reference CQI value for transmitting in the CSI report.

Example 10 includes the apparatus of example 9, wherein the reference CQI value corresponds to one of the plurality of power offset parameters that is defined as equal to one (1), corresponding to a single-user transmission without the MUST.

Example 11 includes the apparatus of example 1, further configured to use radio resource control (RRC) signaling for two or more of the plurality of power offset parameters that are to be used by the UE to calculate a CQI report for the MUST.

Example 12 includes the apparatus of example 1, further configured to use each of the plurality of power offset parameters to scale a post processing signal to interference plus noise ratio (SINR) that is estimated at the UE.

Example 13 includes an apparatus of an eNodeB operable to report channel state information (CSI) for multi-user superposition transmissions (MUST) with a plurality of user equipments (UEs), the apparatus comprising one or more processors and memory configured to: process, for transmission to each of the plurality of UEs, a plurality of power offset parameters for scaling one or more CQI reports from the plurality of UEs; process two or more CQI reports that are received from each of the plurality of UEs, wherein one or more of the two or more CQI reports are scaled based on one or more of the plurality of power offset parameters; select two or more UEs from the plurality of UEs for the MUST; and process a physical downlink shared channel (PDSCH) for transmission to the two or more UEs using the MUST based on the one or more scaled CQI reports received from the each of the two or more UEs.

Example 14 includes the apparatus of example 13, wherein a transmission power of the PDSCH to a first UE of the two or more UEs is scaled to a selected value of Pd, and a transmission power of the PDSCH to a second UE of the two or more UEs is scaled to a value 1−Pd, wherein Pd is a real number within a defined range of 0 to 1.

Example 15 includes the apparatus of example 13, further configured to signal the plurality of power offset parameters to the UE that are defined within a predetermined range.

Example 16 includes the apparatus of example 13, wherein one of the power offset parameters defined as equal to one (1) corresponding to a single-user transmission without the MUST.

Example 17 includes the apparatus of example 13, further configured to process, for transmission to the UE, the power offset parameters on at least one of a radio resource control (RRC), a system information block (SIB), or a master information block (MIB).

Example 18 includes the apparatus of example 13, wherein the two or more CQI reports processed, by the UE, have scaled downlink channel measurements by square rooting one or more of the plurality of power offset parameters prior to calculating the two or more CQI reports, wherein a remaining power is determined as interference if one or more of the plurality of power offset parameters is equal to or greater than a predefined threshold.

Example 19 includes the apparatus of example 13, wherein one or more of the plurality of power offset parameters received from the UE correspond to a calculated differential CQI offset level.

Example 20 includes the apparatus of example 13, further configured to process the CQI reports, received from the UE, that have two or more CQI values relative to a reference CQI value differentially encoded.

Example 21 includes the apparatus of example 13, further configured to process one or more scaled channel measurements received from the UE, wherein each of the one or more scaled channel measurements are configured as a differential CQI value relative to an unscaled reference CQI value.

Example 22 includes the apparatus of example 21, wherein the unscaled reference CQI value corresponds to one or more of the plurality of power offset parameters defined as equal to one (1) corresponding to a single-user transmission without the MUST.

Example 23 includes the apparatus of example 13, further configured to use radio resource control (RRC) signaling for two or more of the plurality of power offset parameters that are to be used by the UE to calculate a CQI report for the MUST.

Example 24 includes the apparatus of example 13, wherein each of the one or more of the plurality of power offset parameters is used to scale a post processing signal to interference plus noise ratio (SINR) that is estimated at the UE.

Example 25 includes at least one machine readable storage medium having instructions embodied thereon for channel state information (CSI) reporting for multi-user superposition transmissions (MUST), the instructions when executed perform the following: process a plurality of power offset parameters that are received from an eNodeB, for the MUST; calculate CQI values for one or more scaled downlink channel measurements; and process, for transmission to the eNodeB, the CQI values for the one or more scaled downlink channel measurements to enable the UE to receive data on a physical downlink shared channel (PDSCH) using multi-user superposition transmission.

Example 26 includes the at least one machine readable storage medium of example 25, further comprising instructions which when executed performs the following: perform a downlink channel measurement at the UE; scale a downlink channel measurement using at least one of the plurality of power offset parameters to form one or more scaled downlink channel measurements; and determine a remaining power as interference if the calculated power offset parameter is equal to or greater than a predefined threshold.

Example 27 includes the at least one machine readable storage medium of example 25, further comprising instructions which when executed performs the following: scale a downlink channel measurement on the CSI-resource signal (RS) by square rooting the plurality of power offset parameters prior to calculating the CQI values; calculate a differential CQI offset level corresponding to each one of the plurality of power offset parameters; and process, for transmission to the eNodeB, the one or more scaled channel measurements, wherein each of the one or more scaled channel measurements are configured as a differential CQI value relative to an unscaled reference CQI value, wherein each of the plurality of power offset parameters are defined within a predetermined range and the unscaled reference CQI value corresponds to one or more of the plurality of power offset parameters defined as equal to one (1) corresponding to a single-user transmission without the MUST.

Example 28 includes an apparatus of a user equipment (UE) operable to report channel state information (CSI) for multi-user superposition transmissions (MUST), the apparatus comprising one or more processors and memory configured to: process a plurality of power offset parameters, that are received from an eNodeB, for the MUST; perform a downlink channel measurement at the UE; scale the downlink channel measurement using at least one of the plurality of power offset parameters to form one or more scaled downlink channel measurements; calculate CQI values for the one or more scaled downlink channel measurements; and process, for transmission to the eNodeB, the CQI values for the one or more scaled downlink channel measurements to enable the UE to receive data on a physical downlink shared channel (PDSCH) using multi-user superposition transmission.

Example 29 includes the apparatus of example 28, wherein each of the plurality of power offset parameters are defined within a predetermined range.

Example 30 includes the apparatus of example 28 or 29, further configured to process, the plurality of power offset parameters, received from the eNodeB, on at least one of a radio resource control (RRC), a system information block (SIB), or a master information block (MIB).

Example 31 includes the apparatus of example 28, further configured to scale the downlink channel measurement on the CSI-RS by square rooting the plurality of power offset parameters prior to calculating the CQI values.

Example 32 includes the apparatus of example 28 or 31, further configured to determine a remaining power as interference if one or more of the plurality of power offset parameters is equal to or greater than a predefined threshold.

Example 33 includes the apparatus of example 28, further configured to restrict the use of each of the plurality of power offset parameters to be used only for calculating the CQI values.

Example 34 includes the apparatus of example 28 or 33, further configured to calculate a differential CQI offset level corresponding to one or more of the plurality of power offset parameters.

Example 35 includes the apparatus of example 28, further configured to process, for transmission to the eNodeB, the one or more scaled channel measurements, wherein each of the one or more scaled channel measurements are configured as a differential CQI value relative to an unscaled reference CQI value.

Example 36 includes the apparatus of example 28 or 35, further configured to differentially encode the CQI values relative to a reference CQI value for transmitting in the CSI report.

Example 37 includes the apparatus of example 28 or 36, wherein the reference CQI value corresponds to one of the plurality of power offset parameters that is defined as equal to one (1), corresponding to a single-user transmission without the MUST.

Example 38 includes the apparatus of example 28, further configured to use radio resource control (RRC) signaling for two or more of the plurality of power offset parameters that are to be used by the UE to calculate a CQI report for the MUST.

Example 39 includes the apparatus of example 28 or 38, further configured to use each of the plurality of power offset parameters to scale a post processing signal to interference plus noise ratio (SINR) that is estimated at the UE.

Example 40 includes an apparatus of an eNodeB operable to report channel state information (CSI) for multi-user superposition transmissions (MUST) with a plurality of user equipments (UEs), the apparatus comprising one or more processors and memory configured to: process, for transmission to each of the plurality of UEs, a plurality of power offset parameters for scaling one or more CQI reports from the plurality of UEs; process two or more CQI reports that are received from each of the plurality of UEs, wherein one or more of the two or more CQI reports are scaled based on one or more of the plurality of power offset parameters; select two or more UEs from the plurality of UEs for the MUST; and process a physical downlink shared channel (PDSCH) for transmission to the two or more UEs using the MUST based on the one or more scaled CQI reports received from the each of the two or more UEs.

Example 41 includes the apparatus of example 40, wherein a transmission power of the PDSCH to a first UE of the two or more UEs is scaled to a selected value of Pd, and a transmission power of the PDSCH to a second UE of the two or more UEs is scaled to a value 1−Pd, wherein Pd is a real number within a defined range of 0 to 1.

Example 42 includes the apparatus of examples 40 or 41, further configured to signal the plurality of power offset parameters to the UE that are defined within a predetermined range.

Example 43 includes the apparatus of example 40, wherein one of the power offset parameters defined as equal to one (1) corresponding to a single-user transmission without the MUST.

Example 44 includes the apparatus of examples 40 or 43, further configured to process, for transmission to the UE, the power offset parameters on at least one of a radio resource control (RRC), a system information block (SIB), or a master information block (MIB).

Example 45 includes the apparatus of example 40, wherein the two or more CQI reports processed, by the UE, have scaled downlink channel measurements by square rooting one or more of the plurality of power offset parameters prior to calculating the two or more CQI reports, wherein a remaining power is determined as interference if one or more of the plurality of power offset parameters is equal to or greater than a predefined threshold.

Example 46 includes the apparatus of example 40 or 45, wherein one or more of the plurality of power offset parameters received from the UE correspond to a calculated differential CQI offset level.

Example 47 includes the apparatus of example 40, further configured to process the CQI reports, received from the UE, that have two or more CQI values relative to a reference CQI value differentially encoded.

Example 48 includes the apparatus of examples 40 or 47, further configured to process one or more scaled channel measurements received from the UE, wherein each of the one or more scaled channel measurements are configured as a differential CQI value relative to an unscaled reference CQI value.

Example 49 includes the apparatus of examples 40 or 48, wherein the unscaled reference CQI value corresponds to one or more of the plurality of power offset parameters defined as equal to one (1) corresponding to a single-user transmission without the MUST.

Example 50 includes the apparatus of example 40, further configured to use radio resource control (RRC) signaling for two or more of the plurality of power offset parameters that are to be used by the UE to calculate a CQI report for the MUST.

Example 51 includes the apparatus of examples 40 or 50, wherein each of the one or more of the plurality of power offset parameters is used to scale a post processing signal to interference plus noise ratio (SINR) that is estimated at the UE.

Example 52 includes one or more transitory or non-transitory machine readable storage mediums having instructions embodied thereon for channel state information (CSI) reporting for multi-user superposition transmissions (MUST), the instructions when executed perform the following: process a plurality of power offset parameters, that are received from an eNodeB, for the MUST; calculate CQI values for one or more scaled downlink channel measurements; and process, for transmission to the eNodeB, the CQI values for the one or more scaled downlink channel measurements to enable the UE to receive data on a physical downlink shared channel (PDSCH) using multi-user superposition transmission.

Example 53 includes the one or more transitory or non-transitory machine readable storage mediums of example 52, further comprising instructions which when executed performs the following: perform a downlink channel measurement at the UE; scale a downlink channel measurement using at least one of the plurality of power offset parameters to form one or more scaled downlink channel measurements; and determine a remaining power as interference if the calculated power offset parameter is equal to or greater than a predefined threshold.

Example 54 includes the one or more transitory or non-transitory machine readable storage mediums of examples 52 or 53, further comprising instructions which when executed performs the following: scale a downlink channel measurement on the CSI-resource signal (RS) by square rooting the plurality of power offset parameters prior to calculating the CQI values; calculate a differential CQI offset level corresponding to each one of the plurality of power offset parameters; and process, for transmission to the eNodeB, the one or more scaled channel measurements, wherein each of the one or more scaled channel measurements are configured as a differential CQI value relative to an unscaled reference CQI value, wherein each of the plurality of power offset parameters are defined within a predetermined range and the unscaled reference CQI value corresponds to one or more of the plurality of power offset parameters defined as equal to one (1) corresponding to a single-user transmission without the MUST.

Example 55 includes an apparatus of a user equipment (UE) operable to report channel state information (CSI) for multi-user superposition transmissions (MUST), the apparatus comprising one or more processors and memory configured to: process a plurality of power offset parameters, that are received from an eNodeB, for the MUST; perform a downlink channel measurement at the UE; scale the downlink channel measurement using at least one of the plurality of power offset parameters to form one or more scaled downlink channel measurements; calculate CQI values for the one or more scaled downlink channel measurements; and process, for transmission to the eNodeB, the CQI values for the one or more scaled downlink channel measurements to enable the UE to receive data on a physical downlink shared channel (PDSCH) using multi-user superposition transmission.

Example 56 includes the one or more transitory or non-transitory machine readable storage mediums of example 55, wherein each of the plurality of power offset parameters are defined within a predetermined range.

Example 57 includes the one or more transitory or non-transitory machine readable storage mediums of example 55 or 56, further configured to: process, the plurality of power offset parameters, received from the eNodeB, on at least one of a radio resource control (RRC), a system information block (SIB), or a master information block (MIB); scale the downlink channel measurement on the CSI-RS by square rooting the plurality of power offset parameters prior to calculating the CQI values; determine a remaining power as interference if one or more of the plurality of power offset parameters is equal to or greater than a predefined threshold; or restrict the use of each of the plurality of power offset parameters to be used only for calculating the CQI values.

In Example 58, the subject matter of Example 54 or any of the Examples described herein may further be configured to: calculate a differential CQI offset level corresponding to one or more of the plurality of power offset parameters; process, for transmission to the eNodeB, the one or more scaled channel measurements, wherein each of the one or more scaled channel measurements are configured as a differential CQI value relative to an unscaled reference CQI value; or differentially encode the CQI values relative to a reference CQI value for transmitting in the CSI report, wherein the reference CQI value corresponds to one of the plurality of power offset parameters that is defined as equal to one (1), corresponding to a single-user transmission without the MUST.

In Example 59, the subject matter of Example 54 or any of the Examples described herein may further be configured to use radio resource control (RRC) signaling for two or more of the plurality of power offset parameters that are to be used by the UE to calculate a CQI report for the MUST.

In Example 60, the subject matter of Example 54 or any of the Examples described herein may further be configured to use each of the plurality of power offset parameters to scale a post processing signal to interference plus noise ratio (SINR) that is estimated at the UE.

Example 61 An apparatus of an eNodeB operable to report channel state information (CSI) for multi-user superposition transmissions (MUST) with a plurality of user equipments (UEs), the apparatus comprising one or more processors and memory configured to: process, for transmission to each of the plurality of UEs, a plurality of power offset parameters for scaling one or more CQI reports from the plurality of UEs; process two or more CQI reports that are received from each of the plurality of UEs, wherein one or more of the two or more CQI reports are scaled based on one or more of the plurality of power offset parameters; select two or more UEs from the plurality of UEs for the MUST; and process a physical downlink shared channel (PDSCH) for transmission to the two or more UEs using the MUST based on the one or more scaled CQI reports received from the each of the two or more UEs.

Example 62 includes the apparatus of example 61, wherein a transmission power of the PDSCH to a first UE of the two or more UEs is scaled to a selected value of Pd, and a transmission power of the PDSCH to a second UE of the two or more UEs is scaled to a value 1−Pd, wherein Pd is a real number within a defined range of 0 to 1.

Example 63 includes the apparatus of any of the examples 61 or 62, further configured to: signal the plurality of power offset parameters to the UE that are defined within a predetermined range; or process, for transmission to the UE, the power offset parameters on at least one of a radio resource control (RRC), a system information block (SIB), or a master information block (MIB), wherein one of the power offset parameters defined as equal to one (1) corresponding to a single-user transmission without the MUST.

In Example 64, the subject matter of Example 61 or any of the Examples described herein may further include, wherein the two or more CQI reports processed, by the UE, have scaled downlink channel measurements by square rooting one or more of the plurality of power offset parameters prior to calculating the two or more CQI reports, wherein a remaining power is determined as interference if one or more of the plurality of power offset parameters is equal to or greater than a predefined threshold.

In Example 65, the subject matter of Example 61 or any of the Examples described herein may further include: process the CQI reports, received from the UE, that have two or more CQI values relative to a reference CQI value differentially encoded, wherein one or more of the plurality of power offset parameters received from the UE correspond to a calculated differential CQI offset level; process one or more scaled channel measurements received from the UE, wherein each of the one or more scaled channel measurements are configured as a differential CQI value relative to an unscaled reference CQI value; or use radio resource control (RRC) signaling for two or more of the plurality of power offset parameters that are to be used by the UE to calculate a CQI report for the MUST, wherein the unscaled reference CQI value corresponds to one or more of the plurality of power offset parameters defined as equal to one (1) corresponding to a single-user transmission without the MUST.

In Example 66, the subject matter of Example 61 or any of the Examples described herein may further include, wherein each of the one or more of the plurality of power offset parameters is used to scale a post processing signal to interference plus noise ratio (SINR) that is estimated at the UE.

Example 67 includes one or more transitory or non-transitory machine readable storage mediums having instructions embodied thereon for channel state information (CSI) reporting for multi-user superposition transmissions (MUST), the instructions when executed perform the following: process a plurality of power offset parameters, that are received from an eNodeB, for the MUST; calculate CQI values for one or more scaled downlink channel measurements; and process, for transmission to the eNodeB, the CQI values for the one or more scaled downlink channel measurements to enable the UE to receive data on a physical downlink shared channel (PDSCH) using multi-user superposition transmission.

Example 68 includes the one or more transitory or non-transitory machine readable storage mediums of example 67, further comprising instructions which when executed performs the following: perform a downlink channel measurement at the UE; scale a downlink channel measurement using at least one of the plurality of power offset parameters to form one or more scaled downlink channel measurements; or determine a remaining power as interference if the calculated power offset parameter is equal to or greater than a predefined threshold.

Example 69 includes the one or more transitory or non-transitory machine readable storage mediums of examples 67 or 69, further comprising instructions which when executed performs the following: scale a downlink channel measurement on the CSI-resource signal (RS) by square rooting the plurality of power offset parameters prior to calculating the CQI values; calculate a differential CQI offset level corresponding to each one of the plurality of power offset parameters; or process, for transmission to the eNodeB, the one or more scaled channel measurements, wherein each of the one or more scaled channel measurements are configured as a differential CQI value relative to an unscaled reference CQI value, wherein each of the plurality of power offset parameters are defined within a predetermined range and the unscaled reference CQI value corresponds to one or more of the plurality of power offset parameters defined as equal to one (1) corresponding to a single-user transmission without the MUST.

Example 70 includes a device for channel state information (CSI) reporting for multi-user superposition transmissions (MUST), the device comprising: means for receiving, from an eNodeB, a plurality of power offset parameters for the MUST: means for calculating CQI values for one or more scaled downlink channel measurements; and means for transmitting, to the eNodeB, the CQI values for the one or more scaled downlink channel measurements to enable the UE to receive data on a physical downlink shared channel (PDSCH) using multi-user superposition transmission.

Example 71 includes the device of claim 70, further comprising means for: performing a downlink channel measurement at the UE; scaling a downlink channel measurement using at least one of the plurality of power offset parameters to form one or more scaled downlink channel measurements; or determining a remaining power as interference if the calculated power offset parameter is equal to or greater than a predefined threshold.

Example 72 includes the device of claim 70, further comprising means for: scaling a downlink channel measurement on the CSI-resource signal (RS) by square rooting the plurality of power offset parameters prior to calculating the CQI values; calculating a differential CQI offset level corresponding to each one of the plurality of power offset parameters; or transmitting, to the eNodeB, the one or more scaled channel measurements, wherein each of the one or more scaled channel measurements are configured as a differential CQI value relative to an unscaled reference CQI value, wherein each of the plurality of power offset parameters are defined within a predetermined range and the unscaled reference CQI value corresponds to one or more of the plurality of power offset parameters defined as equal to one (1) corresponding to a single-user transmission without the MUST.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. An apparatus of a user equipment (UE) operable to report channel state information (CSI) for multi-user superposition transmissions (MUST), the apparatus comprising one or more processors and memory configured to:
   process a plurality of power offset parameters, that are received from an eNodeB, for the MUST;
   perform a downlink channel measurement at the UE;
   scale the downlink channel measurement using at least one of the plurality of power offset parameters to form one or more scaled downlink channel measurements;
   calculate CQI values for the one or more scaled downlink channel measurements;
   process, for transmission to the eNodeB, the CQI values for the one or more scaled downlink channel measurements to enable the UE to receive data on a physical downlink shared channel (PDSCH) using multi-user superposition transmission; and
   differentially encode the CQI values relative to a reference CQI value for transmitting in the CSI report, wherein the reference CQI value corresponds to one of the plurality of power offset parameters that is defined as equal to one (1), corresponding to a single-user transmission without the MUST.

2. The apparatus of claim 1, wherein each of the plurality of power offset parameters are defined within a predetermined range.

3. The apparatus of claim 1, further configured to process, the plurality of power offset parameters, received from the eNodeB, on at least one of a radio resource control (RRC), a system information block (SIB), or a master information block (MIB).

4. The apparatus of claim 1, further configured to scale the downlink channel measurement on the CSI-RS by square rooting the plurality of power offset parameters prior to calculating the CQI values.

5. The apparatus of claim 1, further configured to determine a remaining power as interference if one or more of the plurality of power offset parameters is equal to or greater than a predefined threshold.

6. The apparatus of claim 1, further configured to restrict the use of each of the plurality of power offset parameters to be used only for calculating the CQI values.

7. The apparatus of claim 1, further configured to calculate a differential CQI offset level corresponding to one or more of the plurality of power offset parameters.

8. The apparatus of claim 1, further configured to process, for transmission to the eNodeB, the one or more scaled channel measurements, wherein each of the one or more scaled channel measurements are configured as a differential CQI value relative to an unscaled reference CQI value.

9. The apparatus of claim 1, further configured to use radio resource control (RRC) signaling for two or more of the plurality of power offset parameters that are to be used by the UE to calculate a CQI report for the MUST.

10. The apparatus of claim 1, further configured to use each of the plurality of power offset parameters to scale a post processing signal to interference plus noise ratio (SINR) that is estimated at the UE.

11. An apparatus of an eNodeB operable to report channel state information (CSI) for multi-user superposition transmissions (MUST) with a plurality of user equipments (UEs), the apparatus comprising one or more processors and memory configured to:
process, for transmission to each of the plurality of UEs, a plurality of power offset parameters for scaling one or more CQI reports from the plurality of UEs;
process two or more CQI reports that are received from each of the plurality of UEs, wherein one or more of the two or more CQI reports are scaled based on one or more of the plurality of power offset parameters, wherein one of the power offset parameters defined as equal to one (1) corresponding to a single-user transmission without the MUST;
select two or more UEs from the plurality of UEs for the MUST; and
process a physical downlink shared channel (PDSCH) for transmission to the two or more UEs using the MUST based on the one or more scaled CQI reports received from the each of the two or more UEs.

12. The apparatus of claim 11, wherein a transmission power of the PDSCH to a first UE of the two or more UEs is scaled to a selected value of Pd, and a transmission power of the PDSCH to a second UE of the two or more UEs is scaled to a value 1−Pd, wherein Pd is a real number within a defined range of 0 to 1.

13. The apparatus of claim 11, further configured to signal the plurality of power offset parameters to the UE that are defined within a predetermined range.

14. The apparatus of claim 11, further configured to process, for transmission to the UE, the power offset parameters on at least one of a radio resource control (RRC), a system information block (SIB), or a master information block (MIB).

15. The apparatus of claim 11, wherein the two or more CQI reports processed, by the UE, have scaled downlink channel measurements by square rooting one or more of the plurality of power offset parameters prior to calculating the two or more CQI reports, wherein a remaining power is determined as interference if one or more of the plurality of power offset parameters is equal to or greater than a predefined threshold.

16. The apparatus of claim 11, wherein one or more of the plurality of power offset parameters received from the UE correspond to a calculated differential CQI offset level.

17. The apparatus of claim 11, further configured to process the CQI reports, received from the UE, that have two or more CQI values relative to a reference CQI value differentially encoded.

18. The apparatus of claim 11, further configured to process one or more scaled channel measurements received from the UE, wherein each of the one or more scaled channel measurements are configured as a differential CQI value relative to an unscaled reference CQI value.

19. The apparatus of claim 17, wherein the unscaled reference CQI value corresponds to one or more of the plurality of power offset parameters defined as equal to one (1) corresponding to a single-user transmission without the MUST.

20. The apparatus of claim 11, further configured to use radio resource control (RRC) signaling for two or more of the plurality of power offset parameters that are to be used by the UE to calculate a CQI report for the MUST.

21. The apparatus of claim 11, wherein each of the one or more of the plurality of power offset parameters is used to scale a post processing signal to interference plus noise ratio (SINR) that is estimated at the UE.

22. At least one machine readable storage medium having instructions embodied thereon for channel state information (CSI) reporting for multi-user superposition transmissions (MUST), the instructions when executed perform the following:
process a plurality of power offset parameters that are received from an eNodeB, for the MUST;
calculate CQI values for one or more scaled downlink channel measurements; and
process, for transmission to the eNodeB, the CQI values for the one or more scaled downlink channel measurements to enable the UE to receive data on a physical downlink shared channel (PDSCH) using multi-user superposition transmission;
scale a downlink channel measurement on the CSI-resource signal (RS) by square rooting the plurality of power offset parameters prior to calculating the CQI values;
calculate a differential CQI offset level corresponding to each one of the plurality of power offset parameters; and
process, for transmission to the eNodeB, the one or more scale channel measurements, wherein each one of the one or more scaled channel measurements are configured as a differential CQI value relative to an unscaled reference CQI value, wherein each of the plurality of power offset parameters are defined with in a predetermined range and the unscaled reference CQI value corresponds to one or more of the plurality power offset parameters defined as equal to one (1) corresponding to a single-user transmission without the MUST.

23. The at least one machine readable storage medium of claim 22, further comprising instructions which when executed performs the following:
perform a downlink channel measurement at the UE;
scale a downlink channel measurement using at least one of the plurality of power offset parameters to form one or more scaled downlink channel measurements; and
determine a remaining power as interference if the calculated power offset parameter is equal to or greater than a predefined threshold.

* * * * *